No. 652,803. Patented July 3, 1900.
J. A. McHARDY.
RASP PUNCHING MACHINE.
(Application filed Aug. 12, 1899.)
(No Model.) 6 Sheets—Sheet 4.

WITNESSES,
Mabel Foster
Annie E. Perce

INVENTOR.
James A. McHardy
BY Warren R. Perce
ATT'Y.

No. 652,803. Patented July 3, 1900.
J. A. McHARDY.
RASP PUNCHING MACHINE.
(Application filed Aug. 12, 1899.)
(No Model.) 6 Sheets—Sheet 5.
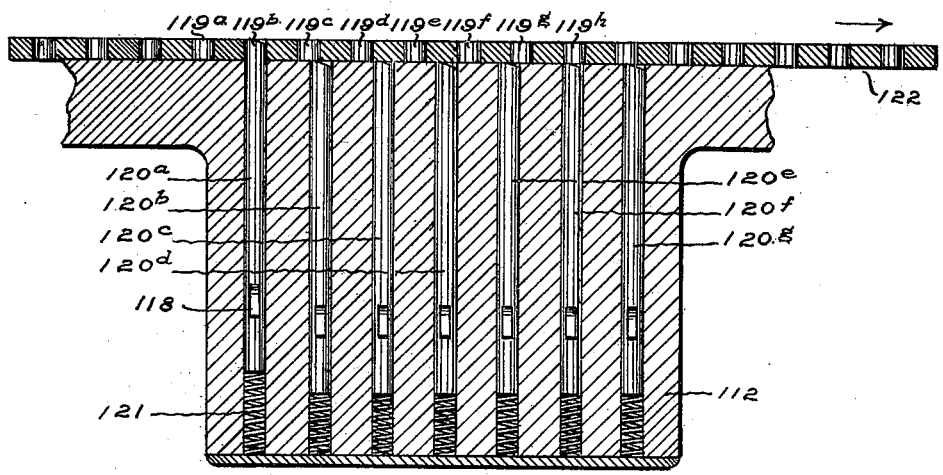
FIG. 5.
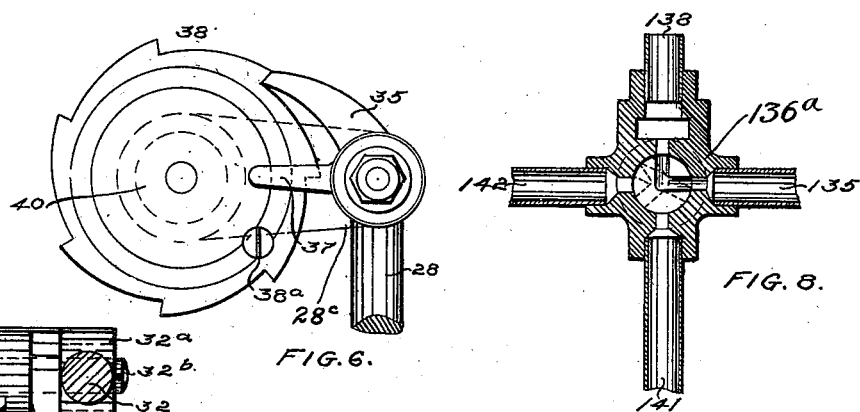
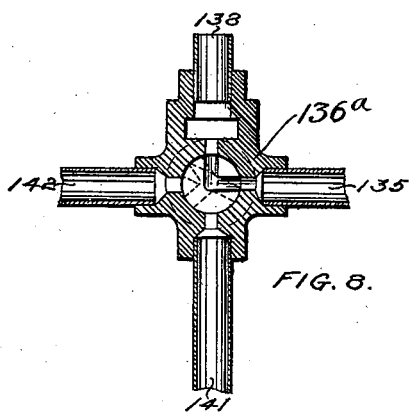
FIG. 8.
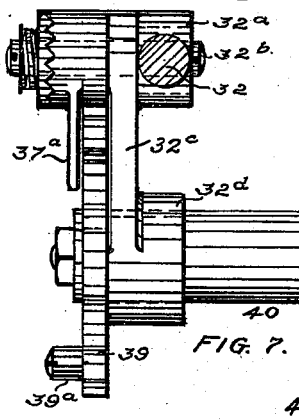
FIG. 6.
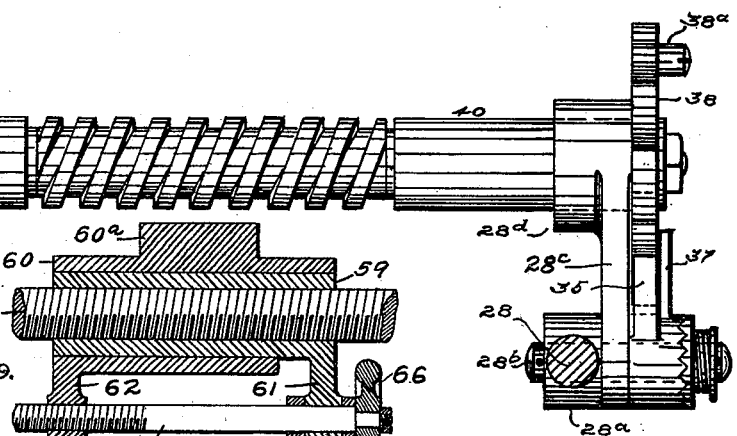
FIG. 7.
FIG. 9.
WITNESSES,
Mabel Foster
Annie E. Perce.
INVENTOR,
James A. McHardy
By Warren R. Perce
ATT'Y.

No. 652,803. Patented July 3, 1900.
J. A. McHARDY.
RASP PUNCHING MACHINE.
(Application filed Aug. 12, 1899.)
(No Model.) 6 Sheets—Sheet 6.

WITNESSES.
Charles T. Hannigan.
Annie E. Perce.

INVENTOR.
James A. McHardy
By Warren R. Perce
Atty.

THE NORRIS PETERS CO., PHOTO-LITHO., WASHINGTON, D. C.

UNITED STATES PATENT OFFICE.

JAMES A. McHARDY, OF PROVIDENCE, RHODE ISLAND, ASSIGNOR OF FIFTY-ONE ONE-HUNDREDTHS TO ELTON C. CHURCH, OF SAME PLACE.

RASP-PUNCHING MACHINE.

SPECIFICATION forming part of Letters Patent No. 652,803, dated July 3, 1900.

Application filed August 12, 1899. Serial No. 727,078. (No model.)

*To all whom it may concern:*

Be it known that I, JAMES A. McHARDY, a subject of the Queen of Great Britain, residing at Providence, in the county of Providence and State of Rhode Island, have invented certain new and useful Improvements in Machines for Punching Rasps, of which the following is a specification, reference being had therein to the accompanying drawings.

Like numerals indicate like parts.

Figure 1:
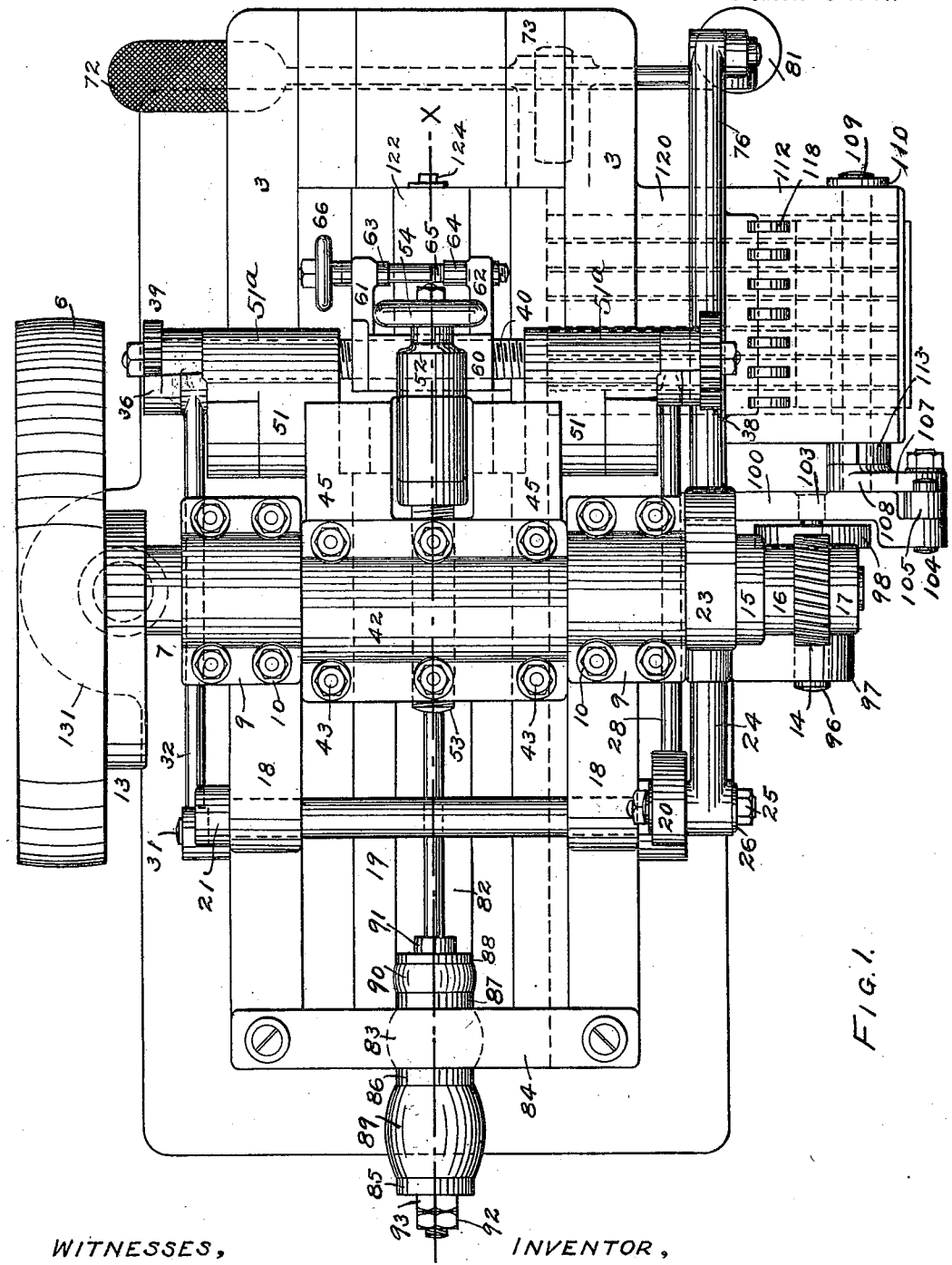
Figure 2:
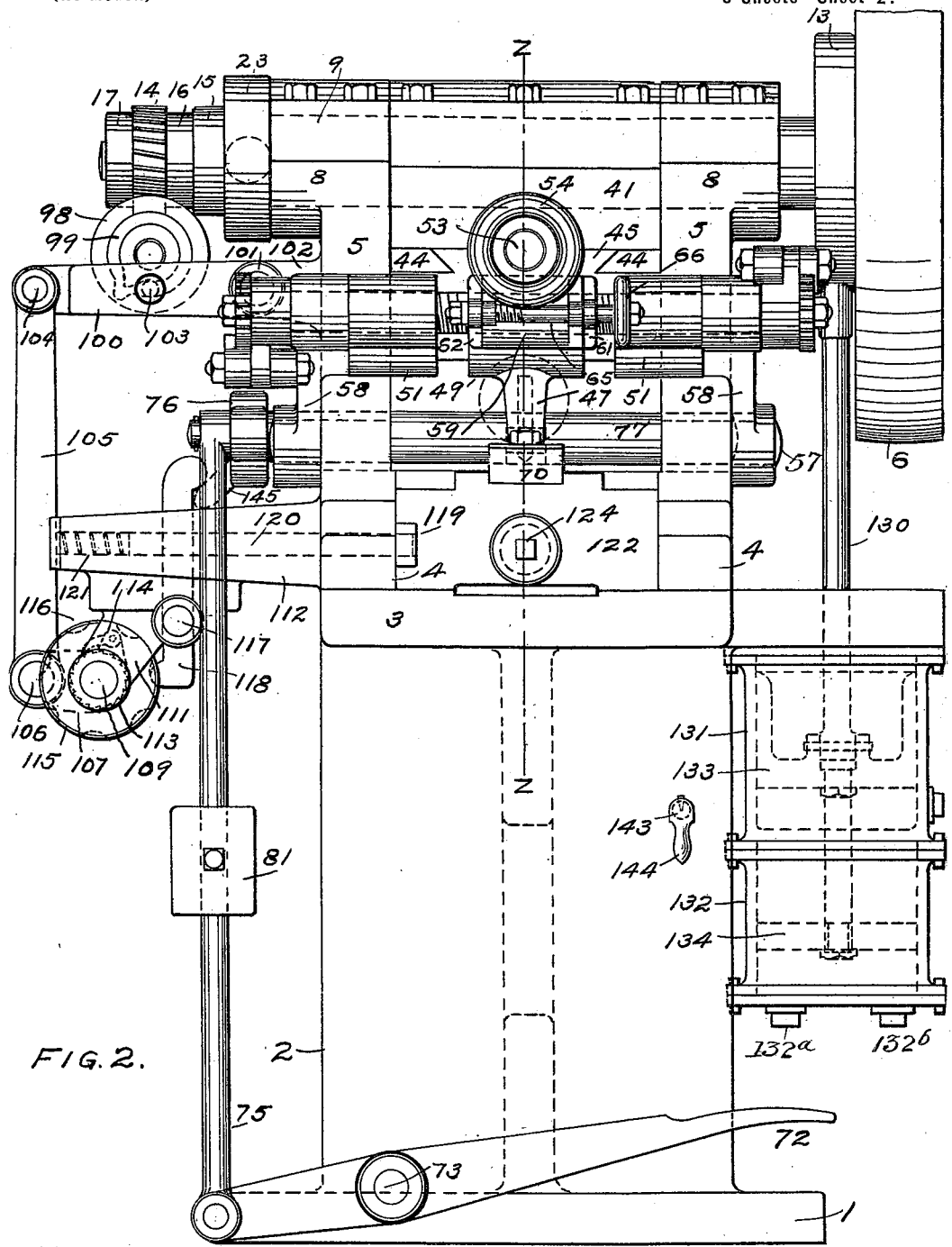
Figure 3:
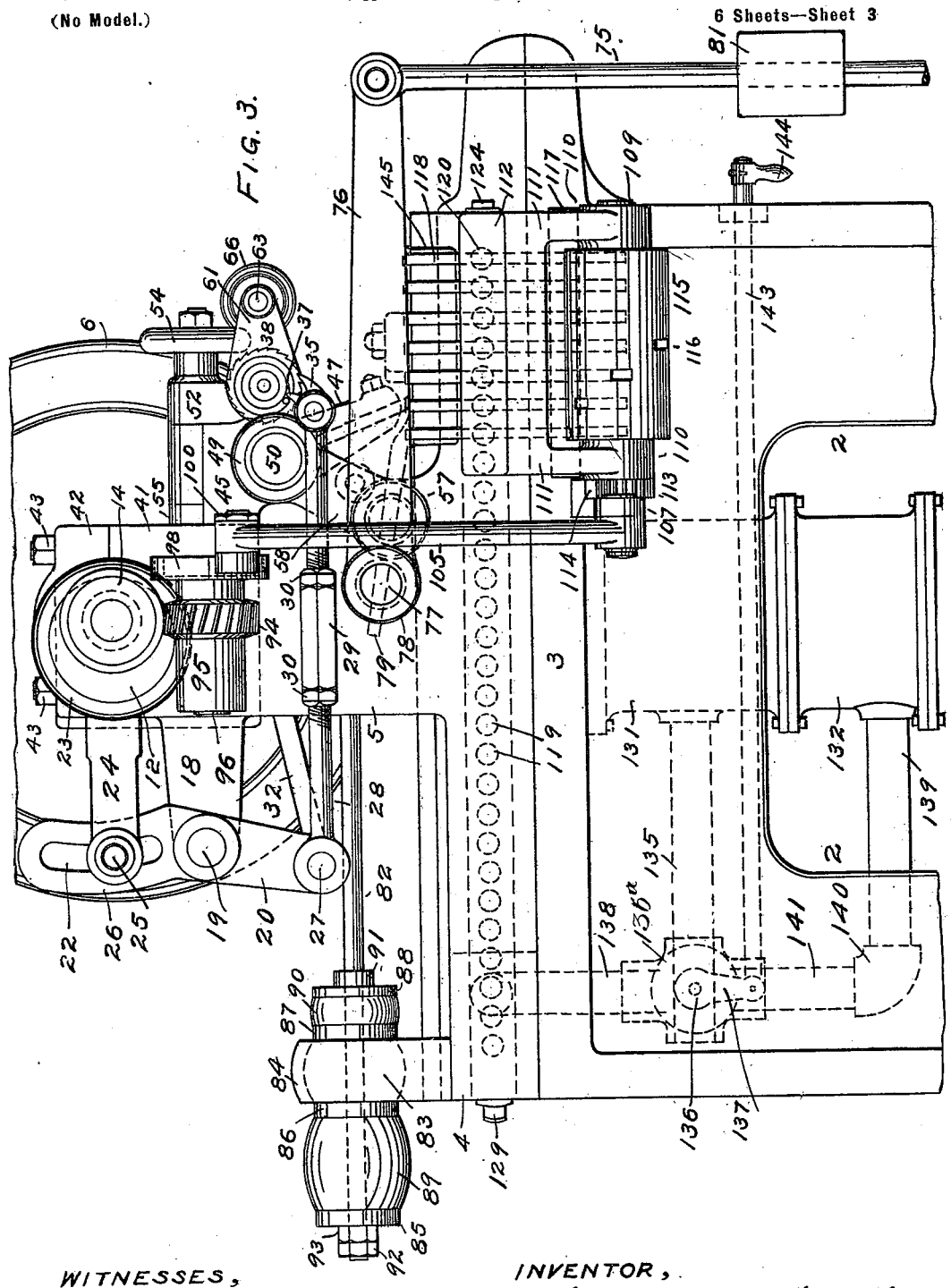
Figure 4:
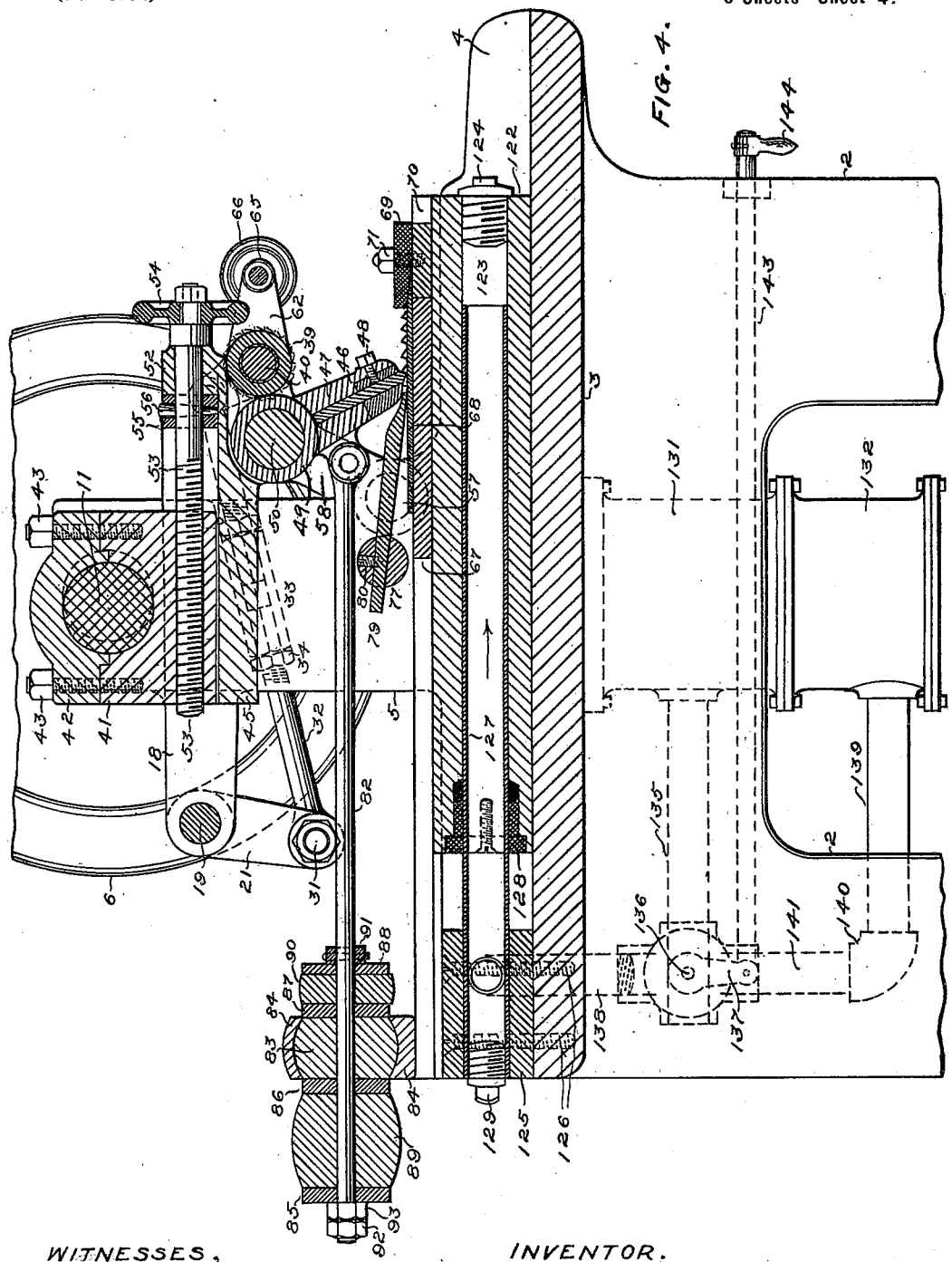
Figure 10:
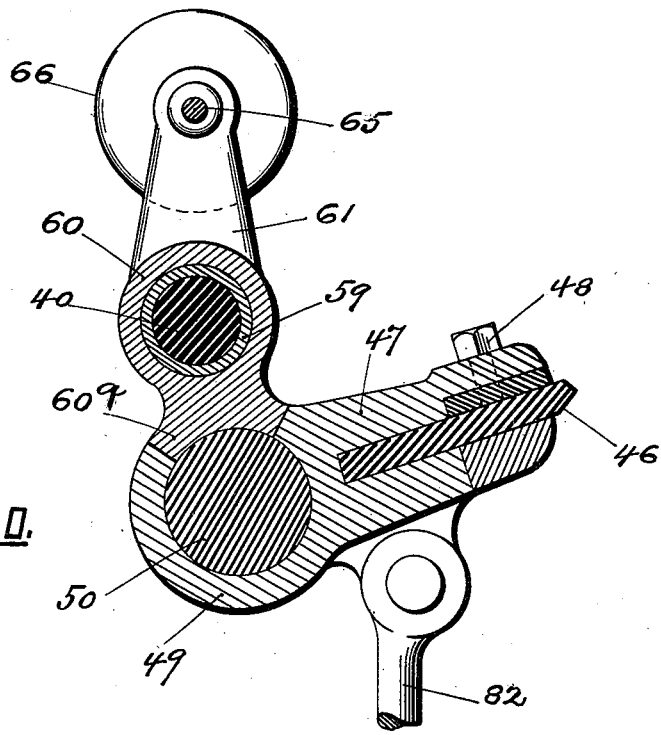
Figure 11:
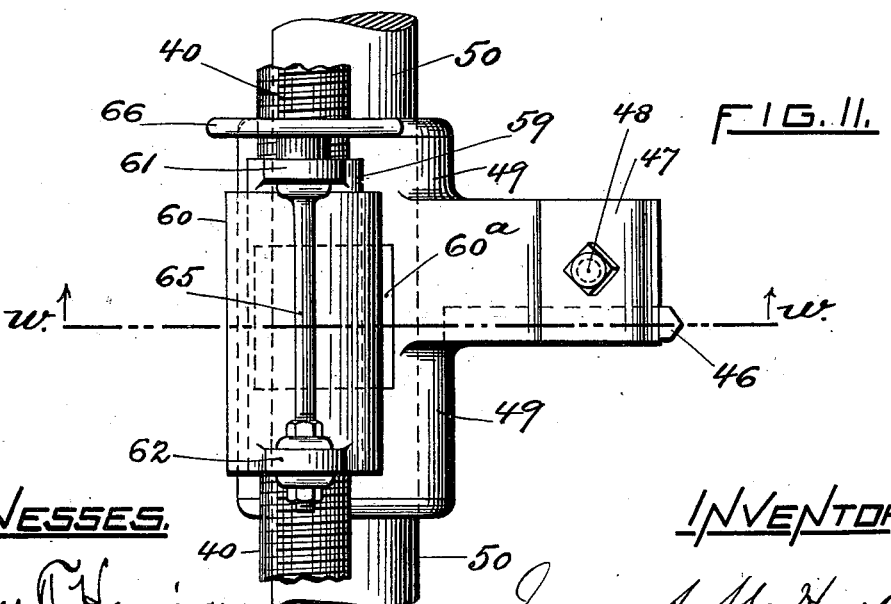

Figure 1 is a top plan of my improved machine for making rasps. Fig. 2 is a front end elevation of the same. Fig. 3 is a side elevation thereof. Fig. 4 is a view of said machine, partly in side elevation and partly in section, on line $x\,x$ of Fig. 1 and on line $z\,z$ of Fig. 2. Fig. 5 is a central horizontal section of the pin-supporting bracket with the pins and spiral springs therein in plan, together with a section in the same plane, of the perforated side of the sliding bed, wherewith said pins are engageable. Fig. 6 shows in elevation one of the feed-rods with its pawl and also the ratchet-wheel of the screw-rod which controls the cross-feed. Fig. 7 is a top plan of the said screw-feed rod and connected parts. Fig. 8 is a central vertical section of the valve and pipes controlling the movements of the air for the travel of the sliding bed. Fig. 9 is a view, partly in elevation and partly in horizontal section, of the cross-feed screw, sleeve-nut, and means for adjusting the tool laterally with reference to the blank. Figs. 10 and 11 are detail views, Fig. 10 being drawn as seen on line $w\,w$ of Fig. 11.

My invention relates to machines for the manufacture of rasps; and it consists in the novel construction and combination of the several parts hereinafter particularly described, as set forth in the claims.

The frame of the machine consists of the base 1, sides or standards 2, table-bed 3, uprights 4, and supports 5.

The machine is driven by power communicated by a belt to the pulley 6, which is fastened upon and turns the main shaft 7. The main shaft 7 is mounted in bearings 8 upon the tops of the supports 5. Caps 9 are bolted at 10 to the bearings 8 to cover the bearing-surfaces of said main shaft. The main shaft 7 has a centrally-arranged crank 11, Fig. 4, two eccentrics, (one marked 12 and the other not shown but carrying the collar 13,) and a worm-gear 14. The hub of the eccentric 12 is shown at 15 and the hub of the worm-gear 14 is shown at 16 and 17. From the supports 5 brackets 18 project, in which is mounted a rock-shaft 19. On the rock-shaft 19 and oscillated by it are the link-arms 20 21. The link-arm 20 is extended upwardly from the rock-shaft 19 and is somewhat curved and made with a curved slot 22, Fig. 3. On the eccentric 12 is a ring or collar 23, and extending therefrom is the arm 24. A bolt or screw 25, with a nut 26 thereon, allows the adjustment of the arm 24 in the slot 22 of the upper extension of the link-arm 20. To the lower end of the link-arm 20 is pivoted at 27 a feed-rod 28, made up of two parts or sections, which are screwed into an interiorly-threaded sleeve or tube 29 (whose opposite ends, respectively, have right-handed and left-handed threads) in order to adjust the length of the rod, and the rod is held in such adjusted position by the check-nuts 30. On the rock-shaft 19, at the opposite end thereof, is the link-arm 21, Fig. 4, to which is pivoted at 31 the feed-rod 32, made up of two parts, connected by an interiorly-threaded sleeve 33 (right-hand and left-hand threaded) and held by nuts 34, as indicated in dotted lines in said figure. The forward ends of the feed-rods 28 32 are supported by bearings 28$^a$ and 32$^a$, respectively, (see Figs. 6 and 7,) upon pins 28$^b$ and 32$^b$. These pins pass through the ends of the rocker-arms 28$^c$ and 32$^c$, whose tubular bearings 28$^d$ and 32$^d$ are mounted on the screw-rod 40, as shown in Fig. 7. On the forward end of each of the feed-rods 28 and 32, on bearings 28$^a$ and 32$^a$, respectively, Fig. 7, is mounted a pawl, that on the rod 28 being shown at 35 and that on the rod 32 being shown at 36. Each of said pawls has a tailpiece, that of the pawl 35 being designated 37 and that of the pawl 36 being designated as 37$^a$, Fig. 7. These pawls 35 and 36 engage, respectively, the ratchet-wheels 38 and 39, which are fastened on and turn with the screw-rod 40. On the outer surface of each of the ratchet-wheels 38 39 is a circular concentric groove or channel (see Figs. 3 and 6) wherein is a pin, which may be made adjustable in said groove or channel, if desired, said groove or channel being made for the purpose of allowing such adjustment. The pin in the ratchet-wheel 38 is designated as $38^a$, and that in the ratchet-wheel 39 is designated as $39^a$. The ratchet-teeth of the wheel 38 project angularly in one direction and those of the wheel 39 in the opposite direction, so that when the ratchet-wheel 38 is intermittently moved by the pawl 35 the screw-rod 40 is turned in one direction, but when the ratchet-wheel 39 is intermittently moved by the pawl 36 the screw-rod 40 is turned in the opposite direction.

The crank 11 of the shaft 7, Fig. 4, is supported in a circular aperture formed in the head or block 41 and the cap or cover 42 thereof, said cap or cover being fastened to the head or block 41 by the screws 43. As shown in Fig. 2, this head or block 41 has two beveled ways 44, between which and supported thereby is the carriage 45, which is capable of adjustment on said head or block.

The cutting-tool 46 is held by the tool-holder 47 in a slot thereof, Fig. 4, and secured in position by the set-screw 48. Said tool-holder has pieces of hardened steel at the bottom, as indicated in Fig. 4. The tool-holder 47 also has a tubular head 49, which is loosely mounted on the shaft 50. The shaft 50 is mounted in the bearings 51, extending from the carriage 45 on each side, Fig. 1. The cylindrical portions of the screw-rod 40 are loosely mounted in other bearings $51^a$, extending from the bearings 51, as fully shown in Fig. 4. From the forward part of the carriage 45 is the projection 52, integral therewith. Through this projection 52, in an aperture thereof, is mounted the shank of a screw 53, which is turned by a hand-wheel 54. A collar 55 surrounds said shank and a pin 56 passes through the collar 55 and shank of the screw-rod 53 to prevent its withdrawal. The threads of the screw 53 engage with the head or block 41, as shown in Fig. 4.

Studs 57 are mounted in the uprights 4, and on said studs are the rocker-arms 58, whose upper tubular bearings receive the shaft 50, on which shaft is the tubular head 49 of the tool-holder 47.

The tool-holder-adjusting means consist of a sleeve 59, whose bore is screw-threaded, (see Fig. 9,) through which the screw-rod 40 passes engageably. This sleeve 59 has a bracket 61, on the end of which is a tubular bearing 63. The sleeve 59 is mounted and movable in the smooth bore of a sleeve 60, from which is a projection $60^a$. The sleeve 60 has a bracket 62, on the end of which is a tubular screw-threaded bearing. An adjusting-screw 65, turned by a hand-wheel 66, has its shank mounted in the bearing 63 of the bracket 61 and its screw-threaded portion mounted and engaged in the tubular threaded bearing 64 of the bracket 62. Said projection $60^a$ enters a recess in the tubular head 49 of the tool-holder 47, as shown in Figs. 10 and 11.

On the table-bed 3 of the machine rests a plate or bar 67 of lead, and the blank 68, which is to be operated upon and made into a rasp, lies upon said plate or bar. The forward end of the blank 68 is secured in position by the blank-holder 69, which extends slightly over it, and said holder 69 is screwed down upon the cross-piece 70 by the screw 71, Fig. 4. A treadle-lever 72 turns on a shaft 73. At the rear of the treadle-lever 72 it is pivotally connected with the rod 75. The rod 75 at its top is pivotally connected with the rocker-arm 76, Fig. 3, which has at its extremity a shaft 77, mounted in a tubular bearing 78. Through the shaft 77 a presser-bar 79 passes, Figs. 3 and 4, and is adjustable therein, being held in position by the screw 80. The free or forward end of the presser-bar 79 rests upon the blank 68 with sufficient force to hold it, caused by the weight 81, on the rod 75. The lead bar or plate 67 is held between the two upwardly-projecting sides of the sliding bed, hereinafter described.

From the back of the tool-holder 47 is a lug, to which is pivotally connected a rod 82. The rod 82 is mounted and movable in a block 83, whose upper and lower surfaces are somewhat spheroidal, Fig. 4. The block is mounted in the cross-piece 84, which is furnished with bearing-surfaces adapted to receive the block 83 and to allow a movement of it therein. This arrangement is shown in Figs. 3 and 4, where 85, 86, 87, and 88 represent collars or washers, and 89 and 90 rubber blocks or springs. A fixed collar 91 is on the rod 82, and the end of the rod 82 is threaded to receive the check-nuts 92 93. The rod 82 passes through said collars and rubber springs, as well as through the block 83.

The worm-gear 14 on the main shaft 7 engages with the worm-gear 94, which, by its hub 95, is mounted on the shaft 96, passing through a bracket 97 from the frame or support 5 of the machine. This worm-gear 94 and its hub 95 have the wheel 98, Fig. 2, rotating therewith. In the outer face of the wheel 98 is the cam-groove 99, whose shape is seen in Fig. 2. A rocker-arm 100 is pivoted at 101 to a lug 102, which extends from the support 5, and said arm 100 has a pin 103, which enters the groove 99 of the wheel 98. At the outer end of the rocker-arm 100 is pivoted at 104 the link-bar 105. The link-bar 105 at its lower end is pivoted at 106 to the rocker-arm 107, whose hub 108 is loosely mounted on the shaft 109. The shaft 109 is mounted in tubular bearings 110 110 of the hangers 111 111 of the pin-supporting bracket 112, which projects from one of the sides 4 of the machine. This shaft 109 is turned by a ratchet-wheel 113. A pawl 114, mounted on the rocker-arm 107, communicates intermittent movement to the ratchet-wheel 113. A drum or cylinder 115 has curved recesses or cam-sockets 116 spirally arranged thereon, and it turns with the shaft 109.

On a rod 117, beneath the bracket 112, are mounted levers 118, each having its ends oppositely bent and rounded, Fig. 2, the lower ends of said levers 118 being adapted and arranged to be seated in the recesses or cam-sockets 116 of the roller 115, respectively.

One of the sides of the sliding bed hereinafter described has a series of circular equidistant holes 119, Fig. 3. A series of pins 120 is mounted in the bracket 112, Fig. 2, in bores therein adapted to receive them, the bottoms of which bores are closed. In each of said bores is a spiral spring 121, pressing one of its ends against the bottom of the bore and the other against the inner end of the pin 120. The spring 121 normally forces the pin 120 into that hole 119 in the side of the sliding bed which is in alinement with it. Each pin is slotted to allow the passage of one of the levers 118 through it, and the bracket 112 is slotted for the same purpose.

On the bed 3 of the machine is the sliding bed 122, movable thereon between the sides 4. The sliding bed 122 has the central tubular bore 123 throughout it from end to end, Fig. 4, the front opening of which bore is closed by the screw-plug 124. A block 125, having a central tubular bore through it, is fastened by screws 126 126 to the bed 3 of the machine. The bores of said block and sliding bed are in alinement and continuous with each other. A tube 127 extends through the bore of the block 125 and nearly through the bore of the sliding bed, as shown in Fig. 4, but is loose in the bore of the sliding bed, so that said bed can slide thereon in the direction indicated by the arrow in Fig. 4. A stuffing-box 128 (with packing) in a recess at the inner end of the bore of the sliding bed surrounds the tube 127. Two screws, one of which is shown in dotted lines in the tube 127 in Fig. 4, control the pressure on the packing of the stuffing-box 128. A screw-plug 129 closes the outer end of the bore of the bulkhead 125.

The collar or ring 13 on the eccentric on the main shaft 7 next to the pulley 6 has the piston-rod 130 connected therewith, Fig. 2. Two cylinders 131 132, whose inner contiguous ends are centrally perforated for the passage of the rod 130, form, respectively, an air-pressure chamber and a vacuum-chamber. In the air-pressure chamber 131 the piston-rod 130 carries a piston 133, and in the vacuum-chamber 132 the piston-rod 130 carries a piston 134. The vacuum-chamber 132 has the inlet and outlet $132^a$ and $132^b$. (Seen in Fig. 2.)

A pipe 135 opens from the air-pressure chamber 131 and extends into a valve $136^a$, (shown in detail in Fig. 8,) whose valve stem or plug 136 has a handle 137. From the valve a pipe 138 extends up and bends to enter the tube 127. A pipe 139 opens from the vacuum-chamber 132 and enters an elbow 140, and a pipe 141 extends from the elbow 140 and enters the said valve. A rod 143 from the handle 137 of the valve is mounted on the frame of the machine and extends in front. At its front or outer end the rod 143 is provided with a handle 144. In Fig. 8 I show the detail of this valve. The valve and stem have three ways—first, the way shown in solid lines in Fig. 8, whereby the pipes 135 and 138 are brought into communication; second, the straight diametrical way, (shown in dotted lines,) whereby the pipes 138 and 141 are brought into communication, and, third, the right-angled way, (shown in dotted lines,) whereby the pipes 138 and 142 are brought into communication.

In Fig. 5 I show in section an escapement device for regulating the movement of the sliding bed 122. This escapement resembles a vernier device and is thus described. The sliding bed is movable during the operation of rasp-cutting in the direction indicated by the arrow in Figs. 4 and 5. The holes 119 in said sliding bed are equidistant, but in the distance between the centers of two adjacent holes, there must be a number of (for the purposes of this explanation say seven) feed movements to present the blank 68 to the action of the cutting-tool 46. In Fig. 5 I have specially designated certain of the holes 119 as $119^a$, $119^b$, $119^c$, $119^d$, $119^e$, $119^f$, $119^g$, and $119^h$, and the pins in said figure, as $120^a$, $120^b$, $120^c$, $120^d$, $120^e$, $120^f$, and $120^g$. The pin $120^a$ is in engagement with the hole $119^b$ and all the other pins are disengaged. By the rotation of drum 115 the recess 116 thereof in line with the lever 118 of the pin $120^a$ moves said lever and withdraws said pin from the hole $119^b$, whereupon the sliding bed 122, being free, moves in the direction of the arrow until the hole $119^c$ comes opposite the pin $120^b$, whereupon the pin $120^b$, by the force of the spiral spring 121 behind it, enters the hole $119^c$. The rotation of the drum 115 brings that one of its recesses 116 which is in line with the lever 118 of the pin $120^b$, whereupon the said lever withdraws the pin $120^b$ from the hole $119^c$, and the sliding bed being free moves until the hole $119^d$ is opposite to the pin $120^c$, which then is forced into it by the pressure of the spiral spring behind it, and so in like manner pin $120^d$ enters hole $119^e$, pin $120^e$ enters hole $119^f$, pin $120^f$ enters hole $119^g$, and pin $120^g$ enters hole $119^h$, consecutively. The sliding bed 122 has by these seven movements now come into such a position that when the pin $120^g$ is withdrawn from the hole $119^h$ the hole $119^a$ moves into position to receive the pin $120^a$. This constitutes substantially a vernier device by which, when the pin $120^a$ is engaged with the hole $119^b$, there must be seven movements of the sliding bed 122 before the hole $119^a$ comes into position to receive the pin $120^a$, or, in other words, while the sliding bed 122 has moved a distance equal to the distance from the center of the hole $119^a$ to the center of the hole 119$^b$, there have been eight distinct and separate movements of the sliding bed 122 to feed the blank 68 to the tool 46.

Having thus described the various parts of my improved machine for the manufacture of rasps, I will now proceed to explain its operation.

The feed motion of the sliding bed 122 is caused by compressed air, as follows: The revolution of the pulley 6, moved by power applied by a belt, rotates the shaft 7, and the eccentric thereon next to said pulley, having the collar 13 mounted on it, reciprocates the piston-rod 130. Air is thus compressed in the well-known manner in the cylinder or chamber 131, and at the same time a vacuum is produced in the chamber or cylinder 132. The compressed air passes from the cylinder 131 through the pipe 135, valve 136, and pipe 138, into the tube 127, and so presses the sliding bed 122 in the direction of the arrow in Fig. 4, said sliding bed, however, being held by one of the pins 120 in one of the holes 119 of the side of said bed, as illustrated in Fig. 5. The rasp-blank 68 is placed on the lead bar 67, with the forward end thereof under the clamp 69, and the screw 71 presses said clamp down on the blank to hold it firmly in position while the cutting operation continues. The presser-bar 79 bears down upon the blank 68 by the force of the weight 81 upon the rod 75.

The adjustment of the tool and tool-holder is as follows: The tool 46 is inserted in the tool-holder 47 with its cutting edge protruding therefrom to the proper extent, and said tool is held in the adjusted position by the screw 48, which passes through the front of the tool-holder and through the steel piece there and bears against the tool, as seen in Fig. 4. The steel pieces at the bottom of the tool-holder there shown are unyielding and hold the tool firmly. The angle of inclination of the tool and tool-holder is regulated by the screw 53, which is turned by the hand-wheel 54. By means of this screw the carriage 45 (through the projection 52 of which the shank of the screw 53 passes) is movable on the beveled ways 44 of the block 41. The farther forward the carriage is moved from the block 41 the nearer the tool-holder 47 will approach a line perpendicular to the blank 68. This adjustment determines the direction of the cut of the tool 46 into the blank 68. The rubber blocks 89 90 on the rod 82 (which extends from the lug on the tool-holder 47 through the oscillating block 83 in the supports 84) serve to prevent the cutting edge of the tool 46 from sliding forward on the blank 68, which would accomplish no useful purpose. They compel the cutting edge of said tool to penetrate the blank, the washer 85, held by the nuts 92 93, compressing the rubber blocks as the tool-holder operates, and thus holding the tool to the work.

A lateral adjustment of the tool 46 and tool-holder 47 in relation to the blank 68 is effected by turning the screw-rod 65 by means of the hand-wheel 66. As said screw is supported in the sleeves of two brackets 61 62, in one of which it is loose and in the other engaged by a screw-thread, the sleeves 59 and 60 can be made to approach each other or to separate from each other. The projection, Fig. 10, entering the recess in the head 49 of the tool-holder 47, being moved to one side or the other by the adjusting-screw 65 locates the tool accurately in a lateral direction with respect to the blank 68.

The cutting operation is as follows: The tool 46 having been located in proper position to cut a tooth upon the rasp-blank 68 at one edge thereof is made to deliver an angular thrusting blow upon the blank by action of the crank 11 of the main shaft 7, the block 41 and its connected carriage 45, which carries the tool-holder 47 and tool 46, being movable by the crank 11 in the circular opening in said block. (Shown in Fig. 4.)

By the construction and arrangement shown and described it will be perceived that in the movement of the tool 46 with its holder 47 said tool always maintains a parallelism of position, and hence cuts all the rasp-teeth with the same degree of angularity. The cross-feed motion giving the tool a position to make the next cut beside the one just made in a crosswise direction is accomplished by the operation of the following mechanism: As the main shaft 7 revolves the rock-shaft 19, mounted in the brackets 18, is moved by the link-arms 20 and 21, such rocking motion being derived from the oscillation of the upper curved extension of the link-arm 20, caused by the throw of the eccentric 12 of the main shaft 7. The extent of this throw, and consequently the degree of the oscillation of the rock-shaft 19, is regulated by the position of the bolt or screw 25 in the slot 22 of said curved part of the link 20, as will be well understood, such adjusted position of the screw 25 being maintained by the nut 26 thereon. The reciprocating movement of the link-arms 20 21, caused by the oscillation of the rock-shaft 19, is communicated to the two feed-rods 28 32. These rods, by means of pawls 35 and 36 at their forward ends, respectively, operate the two ratchet-wheels 38 and 39. These rods 28 32 are supported at their forward ends by the link-bars 28$^c$ and 32$^c$, as fully shown in Figs. 6 and 7. The rods 28 and 32 are adjustable in length by the right-and-left-handed screw-threaded tubes 29 33, by means of which adjustment the said pawls can be brought into proper position to operate the ratchets 38 39. The ratchets 38 39 are fast on the screw-rod 40, but only one of them at a time is operated by its pawl. Suppose, first, that the pawl 35 is in engagement with the ratchet 38 and beneath it, as shown. Then the pawl 36 is not in engagement with the ratchet 39. At each forward movement of the feed-rod 28 the pawl 35 engages a tooth of the ratchet 38 and pushes it around. The ratchet 38 being fast on the screw-rod 40 turns said screw-rod, the threads of which engaging in the sleeve 59 in which said screw-rod 40 is mounted move the same as also the connected sleeve 60, whose projection 60ª entering the recess in the tubular head 49 of the tool-holder 47 carries the tool-holder 47 and tool 46 across the blank 68 to form the series of rasp-teeth in one row across said blank. When the ratchet 38 has nearly completed one revolution, the pin 38ª, Fig. 6, in the groove in the face of said ratchet strikes against the tail 37, which is integral or connected with said pawl 35 and moves it, thereby lifting said pawl out of engagement with said ratchet. At the same instant, however, the pawl 36 on the feed-rod 32 is moved into engagement with the ratchet 39 on the opposite side of the machine; but on that side the pawl is above the ratchet and the teeth of the ratchet 39 extend in a direction opposite to that of the ratchet 38, and so by the action of the pawl 36 on said ratchet 39 the screw-rod 40 is caused to travel in the reverse direction. The sliding-bed feed movement presently to be described has in this interval caused the blank 68 to be advanced longitudinally, and the result is that this reverse movement of the screw-rod 40 enables the tool 46 to cut another row of rasp-teeth on the blank, and in order that the rasp-teeth on this row or series may be made in spaces intermediate between those of the former row or series the teeth of the ratchet 39 are made one-half the space of a ratchet-tooth ahead of the corresponding teeth of the companion ratchet. The ratchet 39 has a pin 39ª, which performs the office, already described, of lifting the pawl 36 out of engagement with the ratchet by means of the tail 37ª thereof. These pins 38ª and 39ᵇ, respectively, serve to move the pawls 35 36 into engagement with their contiguous ratchet-wheels alternately as well as to lift said pawls out of engagement therewith, as above described. In Fig. 7 is shown a device by which the position of the tails 37 and 37ª can be maintained, which consists in notching the edge of the pawl-bearing and using a correspondingly-notched washer upon the pin or pivot 28ᵇ or 32ᵇ, forced into engagement by a spiral spring, bearing on one end against said washer and on the other against the under side of a screw-head, as fully shown in said figure.

The sliding-bed movement, which feeds the blank 68 lengthwise, is given as follows, the air-pressure being ready to move the sliding bed 122 forward in the direction of the arrow in Fig. 4 whenever the escapement device will allow: The worm-wheel 14 on the main shaft 7 turns the worm-wheel 94 on the shaft 96. Said worm-wheel 94 has a cam-grooved wheel 98 connected with it, and the cam-groove 99 receives the pin 103 of the rocker-arm 100. The rocker-arm 100 communicates motion by the rod 105 to the rocker-arm 107, which by means of the pawl 114 moves the ratchet 113 intermittently, thus gradually turning the drum or cylinder 115, which is connected with said ratchet. When a recess 116 of the drum 115 comes into position to receive the lower end of a lever 118, said lever, by force of the spiral spring, (see Fig. 5,) moves forward, carrying with it the pin 120, through which said lever passes, into engagement with that hole 119 of the sliding bed 122, which is in alinement with such pin. In the interval between the disengagement of one pin from the sliding bed and the engagement of another pin with the sliding bed the compressed air in the tube 127 has moved the sliding bed forward.

When it is desired that not any pin 120 shall be engaged with the sliding bed, the depression of the treadle 72 will, by means of the connecting-rod 75, lift the arm 76, and a projection 145 thereof, (shown in dotted lines in Fig. 2,) which lies beneath the upper bent ends of the levers 118, causes the withdrawal of the engaged pin of the series. This same movement of the treadle 72 raises, by means of the rod 75 and lever 76, the presser 79 from contact with the blank 68.

The rearward or return movement of the sliding bed 122 is caused by the following means: By operating the rod 143 by the handle 144 the stem 137 of the valve 136 is moved, thereby closing the pipes 135 and 138 in the valve (which previously have been connected, as shown in Fig. 8) and bringing the bent angular valveway shown in said figure into continuity with the pipes 138 and 142, whereupon the compressed air escapes through the pipe 142 (which is an exhaust) into the external air. The handle 144 is again used to move the rod 143 and the stem 137, so that the pipes 135, 138, and 142 are all closed; but the straightway (shown in Fig. 8 by dotted lines) connects the pipes 138 and 141, whereupon the vacuum in the chamber 132 sucks the air out of the tube, and the sliding bed 122 thus is returned to its former position.

It is obviously within my invention to use steam instead of compressed air for the purpose of moving the sliding bed 122. Steam-pressure can be communicated to the sliding bed to move it in either direction or in both directions alternately.

I claim as a novel and useful invention and desire to secure by Letters Patent—

1. In a machine for the manufacture of rasps, the tooth-cutting device herein described, consisting of the combination of the main shaft and the crank thereon, the head or block having a circular aperture through which the crank passes, a projection from said head or block, two link-bars pivotally mounted at their top to said head or block and pivotally mounted at the bottom to the frame of the machine, a tool-holder pivotally mounted on said projection and extending angularly therefrom and a tool fitted in and extending from the lower edge of said tool-holder, substantially as shown.

2. In a machine for the manufacture of rasps, the tooth-cutting device herein described, consisting of the combination of the main shaft and the crank thereon, the head or block having a circular aperture through which the crank passes, a projection from said head or block, two link-bars pivotally mounted at their top to said head or block and pivotally mounted at the bottom to the frame of the machine, a tool-holder pivotally mounted on said projection and extending angularly therefrom, a rod pivotally mounted at one end upon the rear of said tool-holder, an oscillating block properly supported, through which said rod loosely passes, compressible rubber blocks on said rod and washers, collars and nuts on said rod, all arranged substantially as shown and operating as and for the purpose specified.

3. In a machine for the manufacture of rasps, the combination of the main shaft and the crank thereon, the head or block having a circular aperture through which the crank passes, and also having a screw-threaded bore and two parallel beveled ways, the carriage having a central outwardly-beveled projection by which it is mounted and movable on said ways of the head or block and provided with a projection made with an aperture, two links pivotally mounted at the top thereof to said carriage and at the bottom to the frame of the machine, a shaft mounted in bearings of the carriage, a tool-holder having a tubular head mounted on the last-named shaft and extending angularly from said carriage, a tool held in and projecting from the lower edge of the tool-holder and a shouldered adjusting-screw passing through the aperture of the projection of the carriage and having its threads engageable with the screw-threaded bore of said block or head for the purpose of adjusting the position of the shaft whereon the tool-holder is mounted horizontally into a vertical plane nearer to or farther from the vertical plane of the main shaft to vary the angular direction of the tool, as desired, substantially as specified.

4. In a machine for the manufacture of rasps, the cross-feeding mechanism herein described consisting of the main shaft having an eccentric thereon, the link-arm pivotally mounted at its center upon the frame of the machine and having its upper portion curved and slotted, the rod reciprocally moved by said eccentric and having a pin at its outer end engageable with the slot of the link-arm, the feed-rod pivotally connected at one end with the bottom of said link-arm and pivotally connected at its opposite end with a rocker-arm, the pawl mounted on the last-mentioned end of the feed-rod, the screw-rod mounted loosely in bearings of the carriage and engageable by its threads with a sleeve, a projection from the sleeve engageable with the head of the tool-holder and the ratchet fastened upon said screw-rod and engaged by said pawl, substantially as set forth.

5. In a machine for the manufacture of rasps, the alternating cross-feed mechanism herein described, consisting of the main shaft having an eccentric thereon, a rock-shaft mounted on brackets of the frame, a link-arm centrally fastened on the rock-shaft and having its upper portion curved and slotted, the rod reciprocally moved by the eccentric and having a pin at its outer end engageable with the slot of the link-arm, the feed-rod pivotally connected at one end with the bottom of said link-arm and pivotally connected at its opposite end with a rocker-arm, the pawl mounted on the last-mentioned end of the feed-rod and provided with an angularly-projecting tailpiece, the screw-rod mounted loosely in bearings of the carriage and engaged by its threaded portion in a sleeve having a projection engageable with the head of the tool-holder, the ratchet fastened upon said screw-rod and engaged on its under side by said pawl, a trip-pin extending from the face of the ratchet and adapted to strike the tailpiece of the pawl to disengage the same from the ratchet, the link-arm on the opposite end of the first-named rock-shaft, the feed-rod pivotally connected with the bottom of the last-named link-arm, and pivotally connected at its opposite end with a rocker-arm, a pawl upon the end of the last-named feed-rod provided with a tailpiece projecting angularly therefrom, the ratchet on the opposite end of the screw-rod engaged on its upper side by the pawl last mentioned and having on its face a trip-pin adapted to strike said tailpiece of the last-named pawl to disengage it from the last-named ratchet, the said two ratchets of the screw-rod being so placed and fastened thereon, that the teeth of one of them is turned half a tooth's length in advance of the teeth of the other, all arranged and operating substantially as shown and for the purpose specified.

In testimony whereof I affix my signature in presence of two witnesses.

JAMES A. McHARDY.

Witnesses:
SAMUEL S. STONE,
HOWARD A. LAMPREY.